United States Patent [19]

DeJonghe et al.

[11] 3,959,022

[45] May 25, 1976

[54] METHOD FOR PRODUCING SODIUM-BETA-ALUMINA SOLID ELECTROLYTES

[75] Inventors: Lutgard C. DeJonghe; Harish Chandan, both of Ithaca, N.Y.

[73] Assignee: Cornell Research Foundation, Inc., Ithaca, N.Y.

[22] Filed: July 9, 1975

[21] Appl. No.: 594,549

[52] U.S. Cl. .................... 136/153; 264/61; 264/66
[51] Int. Cl.² .................. H01M 6/04; C04B 35/44
[58] Field of Search ............ 136/6 FS, 153; 264/61, 264/66; 106/63

[56] References Cited

UNITED STATES PATENTS

| | | | |
|---|---|---|---|
| 3,655,845 | 4/1972 | Takewo Chiku | 264/65 |
| 3,895,963 | 7/1975 | McGowan et al. | 136/6 FS |
| 3,896,019 | 7/1975 | Mitoff et al. | 136/153 |

OTHER PUBLICATIONS

DeVries et al., Critical Evaluation of the Literature Data on Beta Alumina and Related Phases: I, Phase Equilibria and Characterization of Beta Alumina Phases, Journal of The American Ceramic Society, Vol. 52, No. 7, pp. 364–369.

*Primary Examiner*—Donald L. Walton
*Attorney, Agent, or Firm*—Lawrence E. Laubscher; Ralph R. Barnard; Theodore C. Wood

[57] ABSTRACT

An improved method is disclosed for producing a solid sodium-beta-alumina electrolyte, characterized by the step of mixing the sodium-beta-alumina powder — prior to sintering — with a sodium-aluminum oxide additive in which the atom ratio of sodium to aluminum is 0.54. Consequently, the temperature to which the resulting mixture must be heated to achieve sintering is greatly lowered (i.e., to between 1600° C. and 1700° C) by the presence of a reactive liquid phase, and the resulting sintered product has a greater density and a lower resistivity, and undesirable abnormal grain growth is avoided.

13 Claims, 2 Drawing Figures

METHOD FOR PRODUCING SODIUM-BETA-ALUMINA SOLID ELECTROLYTES

BRIEF DESCRIPTION OF THE PRIOR ART

As evidenced by the prior Kummer et al U.S. Pat. Nos. 3,404,035, 3,404,036 and 3,413,150, it is well known in the prior art to provide batteries of the type including molten anodes and cathodes (formed, for example, of sodium and sulfur, respectively) that are separated by an ion-permeable solid electrolyte (such as, for example, a sintered body of sodium-beta-alumina).

The conventional sintered sodium-beta-alumina electrolyte has several undesirable drawbacks, as, for example, the requirement of a relatively high sintering temperature (on the order of 1700° – 1800° C.), thereby requiring relatively expensive heating techniques and equipment. Furthermore, the prior solid sintered electrolyte bodies often have an undesirable internal crystalline structure resulting from abnormal grain growth.

In the U.S. patent to Chiku et al U.S. Pat. No. 3,707,589, it was proposed to improve the permeability of a sodium-beta-alumina article permeable to sodium and potassium ions by reheating the article by a second heating step (similar to a first heating step) in an atmosphere having a lower concentration of sodium or potassium than is used in the first heating step. The Minck U.S. Pat. No. 3,514,332 teaches the addition of lithium nitrate and a wax binder to sodium carbonate and aluminum oxide in the production of sodium-beta-alumina articles, and the aforementioned Kummer et al U.S. Pat. No. 3,404,036 discloses the addition of boron oxide to a sodium-beta-alumina solid crystalline electrolyte. The use of other additives, such as yttrium, magnesia, thorium oxide and the like, has also been proposed to improve the physical properties of sintered alumina bodies.

SUMMARY OF THE INVENTION

The present invention was developed to provide an improved method for producing a solid sintered sodium-beta-alumina electrolyte having a relatively lower sintering temperature, and a relatively high density and conductivity, and in which abnormal grain growth is suppressed.

Accordingly, the primary object of the present invention is to provide an improved sintered sodium-beta-alumina electrolyte and method for forming the same, which includes the steps of mixing with the sodium-beta-alumina powder an additive which consists of a mixture of sodium oxide and aluminum oxide, the atom ratio of sodium to aluminum in said additive mixture being 0.54, and heating the mixture to a reactive liquid phase sintering temperature of from between 1600° C. to 1700° C. for a sufficient period of time (about one hour) to produce a solid sintered body.

According to another object, the resultant sodium-beta-alumina electrolyte is subjected to a final annealing heat treatment at a temperature of about 1375° C. for a period of from about 20 to 70 hours, thereby to lower the resistivity of the sintered body to a desired value. For example, for a sintered body subjected to such a post-heating treatment, the resistivity was reduced from 41 ohm-cm to a desired value of 26 ohm-cm, thereby making the cell using the solid electrolyte suitable for battery application.

A more specific object of the invention is to provide a method for producing a solid sodium-beta-alumina electrolyte in which, as a preliminary step, the sodium-aluminum oxide additive is produced by the decomposition of sodium nitrate and aluminum nitrate. More particularly, the nitrates are mixed in such quantities as to produce an atom ratio of sodium to aluminum of 0.54 (which corresponds with the eutectic composition as determined from the phase diagram of a sodium oxide-aluminum oxide system), and the nitrate mixture is quickly heated (by introduction into a hot furnace, for example) to a temperature of from about 700° C. to 850° C. for a sufficient period of time (from about one-half to one hour) to effect decomposition of the nitrates and thereby produce sodium-aluminum oxide. The sodium-aluminum oxide and the sodium-beta-alumina powder are simultaneously milled together to effect complete mixing of the components. In the alternative, mixing of the sodium-aluminum oxide mixture, in powder form, with the sodium-beta-alumina powder may be accomplished by adding the powders to a volatile liquid to form a slurry, and continuously stirring the slurry as the liquid evaporates.

According to another object of the invention, the sodium-beta-alumina powder and the sodium-aluminum oxide additive, in powder form, are pressed into a desired configuration before being subjected to the sintering temperature. The pressing pressure is on the order of 20,000 to 100,000 psi, and is normally about 30,000 psi with no binder added.

According to another object, the sodium-aluminum oxide, in powder form, and the sodium-beta-alumina powder are simultaneously electrophoretically deposited on a mandrel of desired configuration, whereupon the resulting body is removed from the mandrel and is heated to the sintering temperature to form the solid sintered electrolyte.

BRIEF DESCRIPTION OF THE DRAWING

Other objects and advantages of the invention will become apparent from a study of the following specification when viewed in the light of the accompanying drawing, in which.

DETAILED DESCRIPTION

Figure 1:
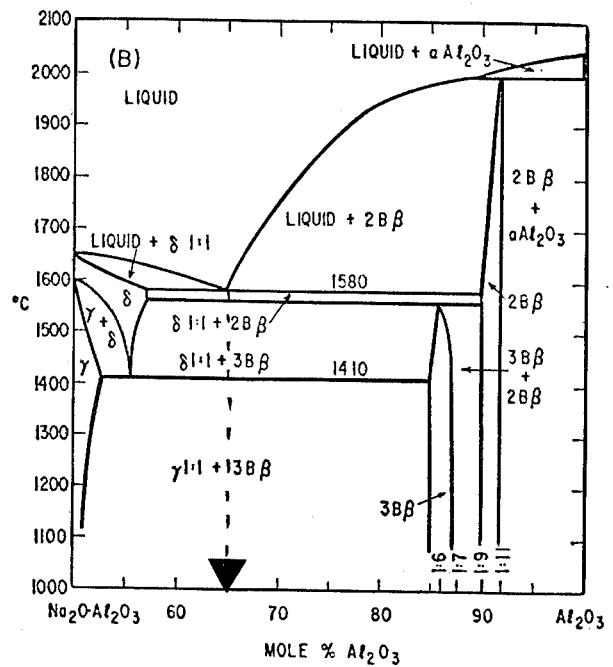
FIG. 1 is a phase diagram of the system $Na_2O$-$Al_2O_3$.

As an initial step to the process of the present invention, a sodium-aluminum oxide additive is prepared (preferably by the simultaneous decomposition of sodium and aluminate nitrates, as will be described in greater detail below) having an atom ratio of sodium to aluminum of 0.54. Referring now to the phase diagram for the system $Na_2O$-$Al_2O_3$ illustrated in FIG. 1 (which is shown on page 367 of "Evaluation of the Literature Data on $\beta$-$Al_2O_3$ and Related Phases," R. C. DeVries and W. L. Roth, Journal of American Ceramic Society, Vol. 52, No. 7, pages 364–369), the ratio 0.54 corresponds with the illustrated eutectic point (at which the mole percent of $Al_2O_3$ is about 65%, and the mole percent of $Na_2O$ is about 35%).

The sodium-aluminum oxide additive is then intimately mixed with the sodium-beta-alumina powder in the concentration of from about 5 to 10 parts, by weight, of additive to 100 parts, by weight, of the sodium-beta-alumina powder. The sodium-beta-alumina powder used may be of a commercially available form (such as Alcoa XB-2, or Alcoa XB-2 superground).

Intimate mixing of the components may be accomplished in one of several manners. In the event that the additive is in the form of a relatively solid foam, it may be milled simultaneously with the sodium-beta-alumina powder for a sufficient period of time to effect complete mixing of the components (for example, for about 2 hours in a ball mill or a vibratory mill). The resultant mixture is then pressed, by conventional press means, producing a pressure on the order of 20,000 to 100,000 psi (preferably about 30,000 psi) into the configuration of the desired solid electrolyte body.

According to a second mixing technique, the sodium-aluminum oxide is milled to powder form and is introduced with the sodium-beta-alumina powder into a volatile liquid to form a slurry. The slurry is then constantly stirred as the liquid is evaporated, and the resultant dry residue is pressed into the desired solid electrolyte configuration as described above.

According to a third mixing procedure, the pressing step may be eliminated by electrophoretically depositing simultaneously upon a mandrel of desired configuration the sodium-beta-alumina powder and the sodium-aluminum oxide additive (in powder form). The resulting electrophoretically deposited body is then removed from the mandrel.

In accordance with a characterizing feature of the invention, the resulting body of the intimately mixed sodium-aluminum oxide and sodium-beta-alumina components (produced either by simultaneous milling and pressing, by slurry evaporation and pressing, or by electrophoretic deposition) is then heated to a relatively low liquid phase sintering temperature of from about 1600° C. or 1700° C. for a period (generally about one hour) sufficient to produce the solid sintered sodium-beta-alumina electrolyte body. Owing to the relatively low sintering temperature, the sintering may be accomplished by means of a conventional relatively inexpensive furnace requiring less energy than is required by furnaces operating at higher sintering temperatures.

The resultant solid sintered electrolyte has a uniform crystalline structure, since abnormal grain growth has been avoided. Furthermore, the solid electrolyte of the present invention has a lower resisitivity and a greater density than similar pure sodium-beta-alumina electrolytes which are not provided with the sodium-aluminum oxide additive. For example, laboratory tests reveal that as compared with a pure sodium-beta-alumina electrolyte (having no additive) which had a resistivity at 300° C. of 97 ohm-cm and a density of 2.99 g/cm$^3$, the solid sintered electrolyte of the present invention containing the sodium-aluminum additive had a resistivity at 300° C. of 41 ohm-cm and a density of 3.11 g/cm$^3$.

Figure 2:
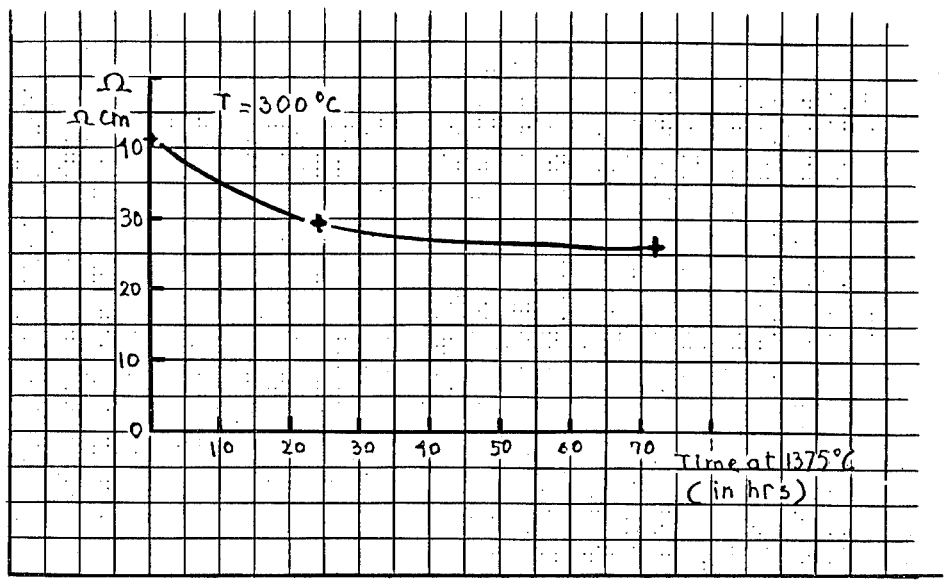
FIG. 2 is a curve illustrating resistivity of a solid sintered sodium-beta-alumina electrolyte plotted against annealing time.

The resistivity of the solid sintered sodium-beta-alumina electrolyte of the present invention may be further reduced by post-annealing techniques. Referring to FIG. 2, it will be seen that as the solid electrolyte is heated at 1375° C., the resistivity decreases from 41 ohm-cm to about 30 ohm-cm in about 25 hours, and to about 26 ohm-cm in about 72 hours.

EXAMPLE

An example of the invention will now be described in which the sodium-aluminum oxide additive was prepared by the decomposition of sodium and aluminum nitrates.

100 grams of $Al(NO_3)_3 \cdot 9H_2O$ were mixed in a platinum crucible with 6.1 grams of $NaNO_3$, which mixture was then rapidly heated to about 800° C. by introduction into a hot furnace. The nitrates first melt together and then decompose into oxides, giving off nitrous fumes. After heating for about ½ to 1 hour at 800° C., the mixture was removed from the furnace and permitted to cool, whereupon a metastable amorphous oxide was produced having a composition $Na_{0.54} AlO_{3.54}$ which corresponds with the eutectic composition shown in the phase diagram of FIG. 1.

10 grams of the sodium-aluminum oxide additive were then mixed with 100 grams of sodium-beta-alumina powder (Alcoa XB-2) by milling for about 2 hours in a ball mill so as to achieve intimate mixing. The resulting mixture was cold pressed to a desired configuration in an ejection die at a pressure of about 30,000 psi., no binder being added. The ten weight percent of additive increased the $Na_2O$ content of the initial sodium-beta-alumina powder by about 2 mole percent. Since the starting sodium-beta-alumina powder had approximately 88 to 89 mole percent $Al_2O_3$, the final composition of the sintered electrolyte is in the useful composition range.

The resultant pressed mixture was then sintered at 1650° C. in a radio-frequency induction heated furnace under a protective atmosphere of argon for one hour. The resulting sintered body was packed in its own powder so as to minimize soda loss. The heating up rates were rapid (i.e., about 50°C/min near 1600° C.).

The sintered electrolyte body was then annealed at 1375° C. for 40 hours to reduce resistivity to the desired value.

Owing to the presence of the lower melting eutectic powder additive (having the aforementioned sodium to aluminum atom fraction ratio of 0.54), the sodium-beta-alumina electrolyte may be fabricated by a pressureless sintering method at temperatures between 1600° C. and 1650° C. (as distinguished from powders without the additive which must be sintered at temperatures above 1700° C.). The lowered sintering temperatures allow the use of simpler furnaces, or allow increased furnace life. The lower sintering temperature also decreases the problem of loss of volatile components during fabrication (e.g., $Na_2O$ loss during preparation of the sodium-beta-alumina solid electrolyte). The lower preparation temperature also decreases abnormal grain growth during sintering very significantly.

While in accordance with the provision of the Patent Statutes the preferred form and embodiments of the invention have been illustrated and described, it will be apparent that changes may be made without deviating from the inventive concepts set forth above.

What is claimed is:
1. The method for producing a solid sintered sodium-beta-alumina electrolyte, which comprises the steps of
   a. preparing a sodium-aluminum oxide mixture in which the atom ratio of sodium to aluminum is 0.54;
   b. mixing 100 parts, by weight, of sodium-beta-alumina powder with about 5 to 10 parts, by weight, of the sodium-aluminum oxide mixture; and c. heating the resulting mixture to a reactive liquid phase sintering temperature of from between 1600° to 1700° C. for a sufficient time to produce a solid sintered body.

2. The method as recited in claim 1, wherein the said resulting mixture is heated at the sintering temperature for about 1 hour.

3. The method as recited in claim 1, and further including the final step of d. annealing the sintered compound body at a temperature of about 1,375° C. for a period of from about 20 to 70 hours, thereby to lower the resistivity of the sintered compound to a desired value.

4. The method as recited in claim 1, and further including the step, prior to the heating step, of pressing together the sodium-aluminum oxide mixture with the sodium-beta-alumina powder at a pressure of from about 20,000 psi to 100,000 psi, thereby to form a body of desired configuration which is to be subsequently sintered.

5. The method as recited in claim 1, and further including the step, prior to the heating step, of electrophoretically depositing simultaneously the sodium-aluminum oxide mixture and the sodium-beta-alumina powder upon a mandrel, thereby to define the body which is to be subsequently sintered.

6. The method as recited in claim 1, wherein the sodium-aluminum oxide mixture is produced by the steps of 1. mixing together sodium nitrate and aluminum nitrate in such quantities as to produce an atom ratio of sodium to aluminum of 0.54; and 2. heating the nitrate mixture to a temperature of from about 700° to 850° C. for a sufficient period of time to effect decomposition of the nitrates and thereby produce sodium-aluminum oxide.

7. The method as recited in claim 6, wherein the nitrate mixture is rapidly heated by introduction into a hot furnace.

8. The method as recited in claim 7, wherein said nitrate mixture is heated for about ½ to 1 hour.

9. The method as recited in claim 6, wherein 6.1 parts, by weight, of $NaNO_3$ are mixed with 100 parts, by weight, of $Al(NO_3)_3.9H_2O$.

10. The method as recited in claim 9, wherein the sodium-aluminum oxide mixture is in the form of a solid foam, and further wherein said sodium-aluminum oxide mixture and said sodium-beta-alumina powder are simultaneously mixed and reduced to fine powder by milling.

11. The method as recited in claim 9, wherein the sodium-aluminum oxide mixture is in the form of a solid foam, and further including the step of milling to powder form the sodium-aluminum oxide mixture.

12. The method as recited in claim 11, wherein the sodium-aluminum oxide powder and the sodium-beta-alumina powder are mixed with a volatile liquid to form a slurry, and further including the steps of continuously stirring the slurry while evaporating the volatile liquid.

13. The solid sintered sodium-beta-alumina electrolyte produced by the method of claim 1.

* * * * *

UNITED STATES PATENT OFFICE
CERTIFICATE OF CORRECTION

PATENT NO. : 3,959,022
DATED : May 25, 1976
INVENTOR(S) : Lutgard C. DeJonghe et al.

It is certified that error appears in the above-identified patent and that said Letters Patent are hereby corrected as shown below:

Column 4, line 7, change "100 grams" to:

-- 50 grams --

Column 6, line 14, after "are mixed with", change "100 parts" to: -- 50 parts --

Signed and Sealed this

Twenty-sixth Day of October 1976

[SEAL]

Attest:

RUTH C. MASON
*Attesting Officer*

C. MARSHALL DANN
*Commissioner of Patents and Trademarks*

Dedication 3,959,022.—*Lutgard C. DeJonghe* and *Harish Chandan*, Ithaca, N.Y. METHOD FOR PRODUCING SODIUM-BETA-ALUMINA SOLID ELECTROLYTES. Patent dated May 25, 1976. Dedication filed June 27, 1977, by the assignee, *Cornell Research Foundation, Inc.*

Hereby dedicates to the Public the entire term of said patent.

[*Official Gazette August 23, 1977.*]